US007113789B1

(12) United States Patent
Boehmke

(10) Patent No.: US 7,113,789 B1
(45) Date of Patent: Sep. 26, 2006

(54) METHOD AND SYSTEM FOR TRACKING FACILITIES RELATED INFORMATION

(75) Inventor: Yuergen Boehmke, Parkland, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 966 days.

(21) Appl. No.: 09/963,151

(22) Filed: Sep. 24, 2001

Related U.S. Application Data

(63) Continuation-in-part of application No. 09/746,502, filed on Dec. 22, 2000.

(51) Int. Cl.
*H04Q 7/20* (2006.01)

(52) U.S. Cl. .................. 455/446; 455/447; 455/560; 455/561; 455/67.11; 455/423; 455/424; 455/425; 379/1.01

(58) Field of Classification Search ........ 455/446–447, 455/423–425, 560–561, 67.11; 379/1.01, 379/201.05
See application file for complete search history.

(56) References Cited

U.S. PATENT DOCUMENTS

| 4,819,162 | A |   | 4/1989  | Webb, Jr. et al.                  |
|-----------|---|---|---------|-----------------------------------|
| 5,095,500 | A | * | 3/1992  | Tayloe et al. ............ 379/32.01 |
| 5,216,612 | A | * | 6/1993  | Cornett et al. ............. 700/96 |
| 5,285,494 | A | * | 2/1994  | Sprecher et al. ........... 455/423 |
| 5,297,193 | A |   | 3/1994  | Bouix et al. ............... 455/423 |
| 5,412,758 | A | * | 5/1995  | Srikanth et al. ............. 706/59 |
| 5,425,076 | A |   | 6/1995  | Knippelmier                       |
| 5,426,688 | A |   | 6/1995  | Anand                             |
| 5,491,644 | A | * | 2/1996  | Pickering et al. ......... 709/226 |
| 5,530,861 | A | * | 6/1996  | Diamant et al. ............. 705/8 |
| 5,640,684 | A | * | 6/1997  | Konosu et al. ............ 455/67.7 |
| 5,710,917 | A |   | 1/1998  | Musa et al. ............... 395/610 |
| 5,799,154 | A |   | 8/1998  | Kuriyan ..................... 709/223 |
| 5,826,252 | A | * | 10/1998 | Wolters et al. ................ 707/1 |
| 5,867,558 | A |   | 2/1999  | Swanson                           |
| 5,905,988 | A |   | 5/1999  | Schwartz et al. .......... 707/104 |
| 5,940,471 | A |   | 8/1999  | Homayoun                          |
| 6,008,808 | A | * | 12/1999 | Almeida et al. ............ 715/767 |
| 6,012,067 | A |   | 1/2000  | Sarkar                            |
| 6,016,340 | A |   | 1/2000  | Bayraktar                         |

(Continued)

OTHER PUBLICATIONS

Borland Paradox for Windows-User Guide, 1994, Avery Denison, pp. 21 and 175-177.

(Continued)

*Primary Examiner*—William Trost
*Assistant Examiner*—Sharad Rampuria
(74) *Attorney, Agent, or Firm*—Merchant & Gould

(57) ABSTRACT

A method and system are provided for collecting, maintaining and tracking data for facilities-related information. Data on a variety of remote, stand-alone, and networked facilities is collected and stored with reference to the physical locations of the facilities. Using the physical locations of facilities and any connecting circuits between interrelated and networked facilities, the data is presented to a user of the data through graphical user interfaces and through a mapping program that presents a map of a region in which the user operates, showing facilities under the user's charge in their respective locations on the map. The user may zoom in to the location of a selected facility to obtain a detailed view and detailed information on that facility, including information on connections between facilities. New facilities may be entered and existing facilities may be edited using a graphical user interface, and once the facilities information is entered or edited, the computer-generated map is refreshed to show the changes. Routes of circuits between related facilities are shown and filtering of the views may be accomplished to show only certain components of facilities on the map.

26 Claims, 15 Drawing Sheets

U.S. PATENT DOCUMENTS

| | | | |
|---|---|---|---|
| 6,018,567 A | | 1/2000 | Dulman |
| 6,108,536 A | * | 8/2000 | Yafuso et al. .............. 455/424 |
| 6,111,857 A | * | 8/2000 | Soliman et al. ............ 370/254 |
| 6,131,031 A | * | 10/2000 | Lober et al. ................ 455/444 |
| 6,141,565 A | * | 10/2000 | Feuerstein et al. ......... 455/560 |
| H1921 H | | 11/2000 | Fletcher et al. ............ 455/433 |
| 6,212,260 B1 | | 4/2001 | Baum et al. |
| 6,233,313 B1 | | 5/2001 | Farris et al. |
| 6,282,514 B1 | | 8/2001 | Kumashiro |
| 6,330,312 B1 | | 12/2001 | Wright et al. |
| 6,336,035 B1 | * | 1/2002 | Somoza et al. ............ 455/446 |
| 6,347,217 B1 | | 2/2002 | Bengtsson et al. ......... 455/67.7 |
| 6,356,758 B1 | * | 3/2002 | Almeida et al. ............ 455/446 |
| 6,366,609 B1 | | 4/2002 | Rossi ........................ 375/222 |
| 6,393,419 B1 | | 5/2002 | Novak et al. |
| 6,408,304 B1 | | 6/2002 | Kumhyr |
| 6,411,969 B1 | | 6/2002 | Tam |
| 6,445,916 B1 | | 9/2002 | Rahman |
| 6,504,907 B1 | | 1/2003 | Farris et al. |
| 6,512,916 B1 | * | 1/2003 | Forbes, Jr. .............. 455/67.16 |
| 6,519,452 B1 | * | 2/2003 | Agostino et al. ........... 455/423 |
| 6,539,082 B1 | | 3/2003 | Lowe et al. |
| 6,571,279 B1 | | 5/2003 | Herz et al. ................. 709/217 |
| 6,574,464 B1 | | 6/2003 | Chen |
| 6,609,100 B1 | * | 8/2003 | Smith et al. .................... 705/8 |
| 6,684,212 B1 | | 1/2004 | Day et al. .................... 707/10 |
| 6,707,472 B1 | | 3/2004 | Grauman .................... 715/752 |
| 6,725,032 B1 | * | 4/2004 | Sheridan et al. ........... 455/419 |
| 6,763,250 B1 | * | 7/2004 | Forbes, Jr. ................. 455/560 |
| 6,788,933 B1 | | 9/2004 | Boehmke ................... 455/423 |
| 6,792,269 B1 | | 9/2004 | Boehmke ................... 455/424 |
| 6,807,265 B1 | | 10/2004 | Boehmke .............. 379/201.05 |
| 6,829,491 B1 | * | 12/2004 | Yea et al. ................... 455/560 |
| 2001/0032170 A1 | | 10/2001 | Sheth .......................... 705/37 |
| 2001/0032263 A1 | | 10/2001 | Gopal et al. |
| 2001/0036825 A1 | * | 11/2001 | Martin ....................... 455/424 |
| 2001/0046230 A1 | | 11/2001 | Rojas |
| 2001/0051890 A1 | | 12/2001 | Burgess ........................ 705/9 |
| 2002/0067810 A1 | | 6/2002 | Barak et al. |
| 2002/0072358 A1 | | 6/2002 | Schneider et al. .......... 455/423 |
| 2002/0119771 A1 | | 8/2002 | Boehmke et al. |
| 2002/0119786 A1 | | 8/2002 | Boehmke |
| 2002/0120638 A1 | | 8/2002 | Boehmke ................... 707/203 |
| 2002/0120765 A1 | | 8/2002 | Boehmke |
| 2002/0123339 A1 | | 9/2002 | Boehmke |
| 2002/0126822 A1 | | 9/2002 | Boehmke |
| 2002/0147668 A1 | | 10/2002 | Smith et al. .................. 705/30 |
| 2003/0086549 A1 | | 5/2003 | Boehmke |

OTHER PUBLICATIONS

U.S. Appl. No. 09/746,502, filed Dec. 22, 2000, entitled "System, Method and Apparatus for Tracking Deployment of Cellular Telephone Network Sites", Inventor: Boehmke.

U.S. Appl. No. 09/955,401, filed Sep. 12, 2001, entitled "System, Method and Apparatus for Maintaining Cellular Telephone Network Site Information", Inventor: Boehmke.

U.S. Appl. No. 09/962,423, filed Sep. 24, 2001, entitled "Method and System for Tracking the Progress of Work Orders in a Telecommunications System", Inventor: Boehmke.

U.S. Appl. No. 09/963,152, filed Sep. 24, 2001, entitled "Project List for Tracking and Validating Employee Time Allocation", Inventor: Boehmke.

U.S. Appl. No. 09/961,510, filed Sep. 24, 2001, entitled "Employee Information Directory", Inventor: Boehmke.

Office Action Summary issued Dec. 2, 2004 on U.S. Appl. No. 09/962,423 (9 pages).

Office Action Summary issued Mar. 4, 2004 in connection with Patent Application Serial No. 09/955,401.

Office Action Summary issued Jan. 8, 2004 in connection with Patent Application Serial No. 09/962,423.

Office Action Summary issued Jun. 30, 2005 in connection with Patent Application Serial No. 09/962,423.

Office Action Summary issued Oct. 10, 2003 in connection with Patent Application Serial No. 09/961,510.

Office Action Summary issued Feb. 6, 2004 in connection with Patent Application Serial No. 09/961,510.

Office Action Summary issued Sep. 25, 2003 in connection with Patent Application Serial No. 09/963,152.

Object Persistence in Object-Oriented Applications, by V. Srinivasan and D. T. Chang, 0018-8670/97/ (c) 1997 IBM (26 pages).

* cited by examiner

METHOD AND SYSTEM FOR TRACKING FACILITIES RELATED INFORMATION

REFERENCE TO RELATED APPLICATION

This is a continuation-in-part of U.S. patent application Ser. No. 09/746,502, entitled "SYSTEM, METHOD AND APPARATUS FOR TRACKING DEPLOYMENT OF CELLULAR TELEPHONE NETWORK SITES", filed Dec. 22, 2000, which is incorporated by reference herein.

TECHNICAL FIELD

This invention relates generally to a system and method for tracking and managing facilities-related information. More particularly, this invention relates to tracking and managing facilities-related information in a telecommunications system.

BACKGROUND OF THE INVENTION

Related art systems provide data and processes, such as computer software programs, multiple databases, spreadsheets and other files that are not interrelated, interconnected or in communication with each other. Accordingly, users of such data and processes on a distributed network are unable to execute the software programs and access the data on a real-time basis. For example, such users are unable to access modifications to the data or upgrades to the software programs. Furthermore, such users are unable to access changes to data which may have an effect on the user's function or processes made by others, on a real-time basis. There is a need for a system that provides real-time access to a network-organized repository of data and processes, such as software programs, within a distributed data and processes information system.

Organization of and access to data and processes associated with facilities management is particularly difficult when facilities are located across wide geographic areas and include a wide range of systems and equipment. For example, in a typical telecommunications system a facilities manager may be charged with the management of telecommunications facilities covering an entire state. Complex wire line and wireless switching systems may be located in one area of the state while remote cellular telecommunications radio sites and antennas maybe scattered near and far requiring maintenance, equipment changes and installation. Such complex and varying systems often are connected by a variety of cables and transmission lines.

In a typical setting, facilities data is maintained manually or in a computer software spreadsheet and is available only to a small number of management personnel. The facilities database and information is often kept at a headquarters location or is maintained separately for each individual facility in a network of facilities. Often a technician working at an individual facility that is part of a larger network of facilities requires information on facilities configurations to which the facility he is maintaining is functionally connected. The information required by the technician may be faxed to the technician or e-mailed to the technician, or the technician may be required to telephone a counterpart technician in a separate facility.

Accordingly, there is a need for a method in the system for collecting, storing and tracking facilities-related information that is accessible by all personnel or groups of personnel needing the data and information for facilities installation, maintenance, and upgrade where the data and information are maintained and updated on a real-time basis in a distributed information system.

It is with respect to these considerations and others that the present invention has been made.

SUMMARY OF THE INVENTION

In accordance with the present invention, the above and other problems are resolved by a method and system for collecting, maintaining and tracking data for facilities-related information. Data on a variety of remote, stand-alone, and networked facilities is collected and stored with reference to the physical locations of the facilities. Using the physical locations of facilities and any connecting circuits between interrelated and networked facilities, the data may be presented to a user of the data through graphical user interfaces and through a mapping program that presents a map of a region in which the user operates showing facilities under the user's charge in their respective locations on the map. Through the use of well-known computer-generated mapping software, mapped facilities information may be updated on a real-time basis, and the user may take advantage of zoom in/zoom out technology to access different views of the area of interest. If the user is interested in particular facilities or the connections between facilities, the user may zoom in to the location of the selected facility to obtain a detailed view and detailed information on that facility, including information on connections between facilities.

New facilities may be entered using a graphical user interface, and once the facilities information is entered, the mapping functionality is updated automatically to show the location of the new facility and its relationship, if any, to other facilities. Routes of circuits between related facilities are shown and filtering of the views may be accomplished to show only certain components of facilities on the map. If desired, the user may search on a particular component in a particular facility to determine the location and relationship of the component to other components and facilities.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
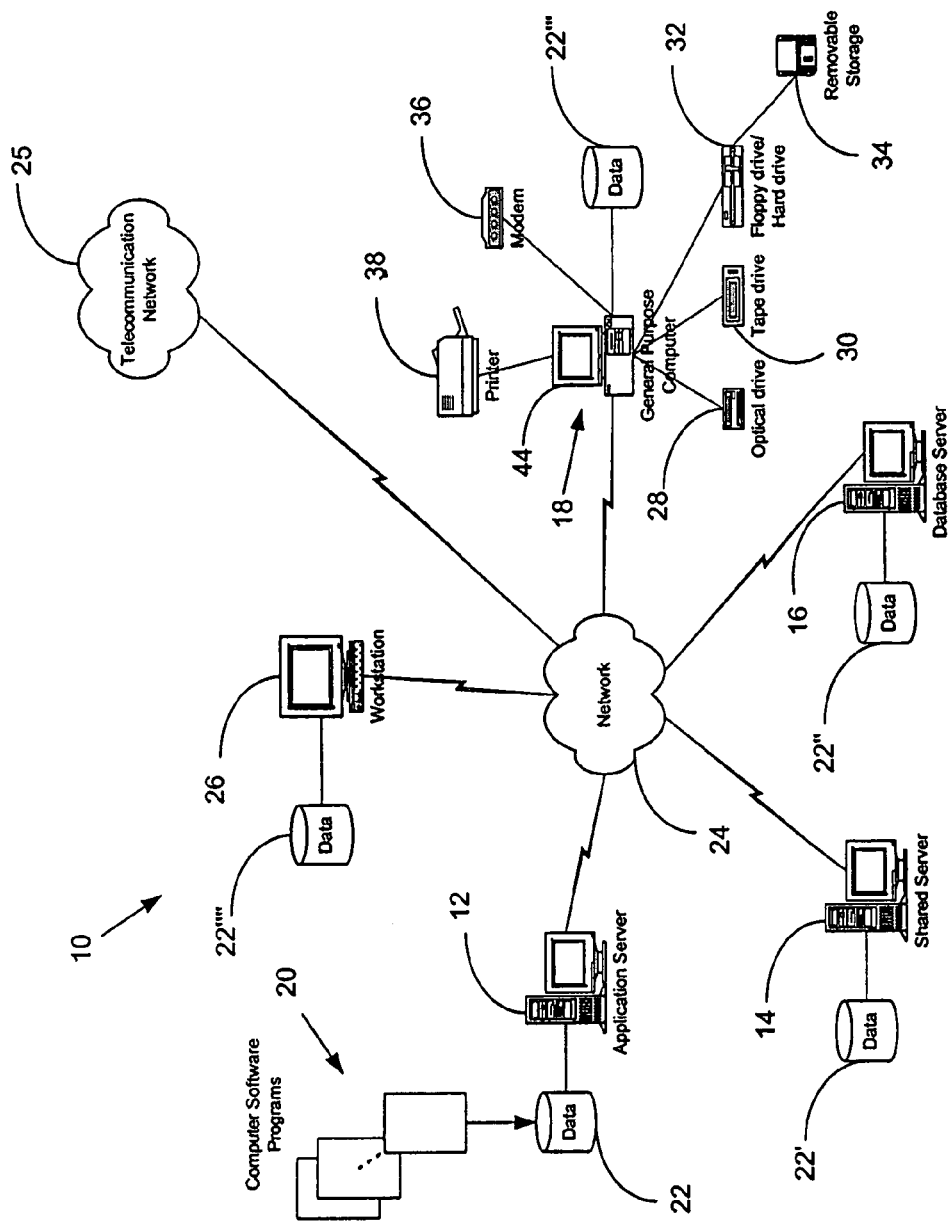
FIG. 1 illustrates an embodiment of a computing system having one or more computers in communication via a network to perform logical operations.

A method and system are provided for collecting, maintaining and tracking data for facilities-related information. Data on a variety of remote, stand-alone, and networked facilities is collected, stored, and maintained in a distributed information system with reference to the physical locations of the facilities. Using the physical locations of facilities and any connecting cables or lines between interrelated and networked facilities, the data may be presented to a user of the data through graphical user interfaces and through a mapping program that presents a map of a region in which the user operates showing facilities under the user's charge in their respective locations on the map. Through the use of well-known computer generated mapping software, mapped facilities information may be updated on a real-time basis, and the user may take advantage of zoom in/zoom out technology to access different views of the area of interest.

For example, if the user is a cellular telecommunications site engineer in south Florida, the user may open a map showing the locations of all cellular telecommunications sites in the state of Florida. The user may then zoom in to a particular city in Florida to see the locations of cellular telecommunications sites in that city. If the user is interested in particular wire line connections between a pair of cellular telecommunications sites, the user may again zoom in to the location of the selected cellular telecommunications sites and the wire line connections between the sites will be displayed. The user may select a particular facility or connection on the map display to be provided detailed information on that facility or connection.

New facilities are entered using a graphical user interface, and once the facilities information is entered, the mapping functionality is updated automatically to show the location of the new facility and its relationship, if any, to other facilities. Routes of circuits between related facilities are shown and filtering of the views may be accomplished to show only certain components of facilities on the map. For example, if the user desires only to see the routes of T-1 lines between facilities in a certain county of a certain state, the user may filter out all other facilities components except for T-1 lines, and the user may zoom in to the county of interest to receive the desired views.

Mapping views may be presented on a time line from the past through the future. That is, the user may obtain a map showing facilities layouts at a time in the past, and the user may obtain a view of facilities layout at a future time based on projected and/or anticipated location information for planned facilities.

If desired, the user may search on a particular component in a particular facility to determine the location and relationship of the component to other components and facilities. Accordingly, the method and system of the present invention allows for the efficient collection, storing, and organization of facilities-related information that allows users of the facilities-related information access and maintenance of data, as well as graphically presented mapping of the locations and interrelationships of various facilities and components therein.

Referring now to the drawings, in which like numerals represent like elements throughout the several figures, aspects of the present invention will be described. The following description with reference to FIGS. 1 through 4 provides an exemplary operating environment for the automated facilities information management system and method of the present invention.

Distributed Information System for Data and Processes

The distributed information system for data and processes in accordance with one embodiment of the invention includes one or more databases and processes, such as computer software programs, that share a common database. In one embodiment, the distributed information system for data and processes can utilize a structured query language (SQL) common database for providing a distributed database management system. For example, a MICROSOFT SQL™ server can be used to provide a common database function whereby a plurality of general-purpose computers in communication with the SQL server can carry out the manipulation of data stored on the SQL server while the SQL server performs other operations associated with the distributed database management system. Those skilled in the art will appreciate that the SQL server can be coupled to or be in communication with one or more storage devices for storing data or computer software programs. In accordance with one embodiment of the invention, any changes that are made to a particular set of data by the one or more computer software programs in one process, or by one or more users, are reflected into and are accessible by other computer software programs within the distributed information system on a real-time basis.

Referring now to FIG. 1, where one embodiment of one set of components that can be used to carry out the system, method and apparatus is illustrated in diagram form. In one embodiment, the system components comprising the distributed information system 10 include an application server 12, a shared server 14, a database server 16, a general-purpose computer 18 and a workstation 26. The application server 12 provides access to one or more computer software programs 20 stored therein or stored in a database 22 in communication with the application server 12. Further in one embodiment, the application server 12 is in communication with one or more other components of the other distributed information system 10, such as the shared server 14, the database server 16, the general-purpose computer 18 and the workstation 26, for example. The one or more system components also can communicate with each other via well-known communications hardware and software. Still further in one embodiment, the one or more system components can be interconnected in a network 24 configuration in accordance with various well-known network topologies. For example, the components of the distributed information system 10 can be interconnected in a bus topology, ring topology, a star topology or combinations thereof. Those skilled in the art will appreciate that any one of these network topologies, or combinations thereof, can provide an adequate implementation of the system, method and apparatus.

The general-purpose computer 18, the shared server 14, the database server 16 and the workstation 26 can each execute the computer software programs 20 stored in the application server 12 or programs that are stored in the database 22 depending on the specific implementation. In one embodiment, the general-purpose computer 18 can perform the function of the workstation 26 or other computing systems without departing from the scope of the invention. Those skilled in the art will appreciate that the general-purpose computer 18 can be provided with various peripherals in communication with or coupled thereto. For example, the general-purpose computer 18 can be coupled to an optical disk drive 28 for reading and writing instructions or data to be used by the general-purpose computer 18. Moreover, a tape drive 30 can be coupled to the general-purpose computer 18 for storing data and processes for backup purposes, for example. In addition, a storage device 32, such as a floppy disk drive or hard disk drive can be coupled to the general-purpose computer 18 for storing instructions and data to be used by the general-purpose computer 18. Instructions and/or data can be provided to the general-purpose computer 18 via a removable storage medium 34. A communication device 36 such as a modem can also be provided with the general-purpose computer 18 to serve various communication purposes. Also, an output device 38, such as a printer, or a monitor 44, can be provided in communication with or coupled to the general-purpose computer 18 for providing the user with reports and the like.

In use, a user operating the general-purpose computer 18 sends a request to access the one or more computer software programs 20 from the application server 12. Such computer software programs 20 can then be delivered to the general-purpose computer 18, the shared server 14, the database server 16 or the workstation 26 for execution thereof. Accordingly, any changes that are made by the user operating the general-purpose computers 18 in communication with the network 24 to any of the programs 20 or data residing within the databases 22 distributed throughout the distributed information system 10, will be available and accessible by the other system components and users. Those skilled in the art will appreciate, that if more than one general-purpose computers 18 are interconnected in a network 24, changes to the database 22 made by one user operating one general-purpose computer will be available and accessible to any other user operating any other general-purpose computer 18 in communication with the network 24 on a real-time basis (e.g., substantially instantaneously).

One embodiment of a hardware environment of a general-purpose computer 18, a distributed information system 10, a telecommunication switch and a switch-master, whereby the instructions of computer software program 20 can be executed by, or interact with, are described below. Furthermore, specific embodiments of the computer software programs 20, such as program 20 for receiving and capturing call processing failures and digital cellular switch failures, communicating and managing telecommunication call records, processing court-ordered surveillance requests, obtaining real-time information associated with a network and tracking the deployment of telecommunication network sites on a real-time basis also are described below.

General-Purpose Computer

Figure 2:
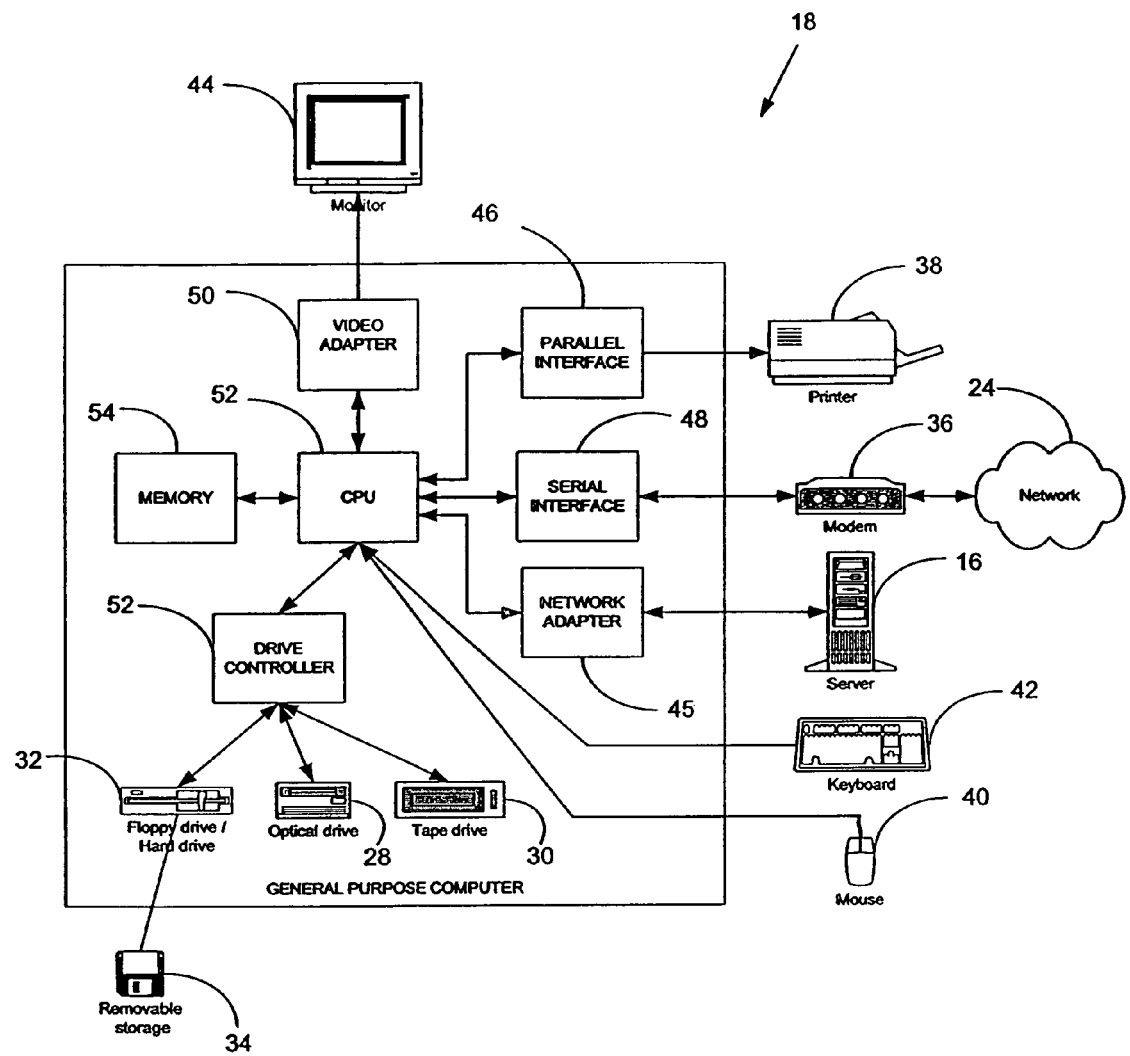
FIG. 2 illustrates an embodiment of a hardware environment of a general purpose computer to perform the logical operations.

Referring now to FIG. 2, one embodiment of a hardware environment of a general-purpose computer 18 provided for executing one or more computer software program 20 instructions is shown in diagram form. The general-purpose computer 18 can be, for example, an IBM-compatible computer that operates under the control of a number of operating systems. For example, the general-purpose computer 18 may operate under a DOS, OS/2, WINDOWS, WINDOWS NT, UNIX, XENIX, LINUX or PICK operating systems, among others, that are generally well known to those skilled in the art.

In one embodiment, the general-purpose computer 18 can include one or more peripherals that are coupled to or are in communication with the general-purpose computer 18. For example, the general-purpose computer 18 can include several input devices such as a mouse 40 or a keyboard 42. Furthermore, the general-purpose computer 18 can include several output devices such as a monitor 44, a printer 38 or a plotter. In addition, the general-purpose computer 18 can include several communication devices such as, for example, a modem 36.

The general-purpose computer 18 can also be adapted to be coupled to or in communication with one or more other general-purpose computers distributed throughout the distributed information system 10. For example, the one or more general-purpose computers can be interconnected or configured as a network 24. As discussed above, the network topology can be a bus topology, a ring topology, a star topology or combinations thereof without departing from the scope of the invention. Those skilled in the art will appreciate that any one of these network topologies, or combinations thereof, can provide an adequate network implementation for the system, method and apparatus. Still other peripherals may be coupled to the general-purpose computer 18 such as, for example, a storage device 32 such as a hard disk drive or floppy disk drive, an optical disk drive 28, a tape drive 30 and the like. Those skilled in the art will appreciate that the above list of peripherals is not exhaustive and that other peripherals may be utilized in conjunction with the general-purpose computer 18 without departing from the scope of the invention.

The general-purpose computer 18 also can include several other components known generally to those skilled in the art as the motherboard, interfaces, adapters and controllers. For example, a network adapter 45 may be utilized to provide a communication means or to couple the general-purpose computer 18 to one or more other general-purpose computers, one or more workstations, or one or more mainframe computers or servers distributed throughout the distributed information system 10. Also, a parallel interface 46 may be provided for coupling the general-purpose computer 18 to various printers 38 and plotters. Furthermore, a serial interface 48 may be provided for interfacing a communication device, such as a modem 36 to the general-purpose computer 18. In addition, a video graphics adapter 50 may be utilized to couple the general-purpose computer 18 to the monitor 44. Moreover, a storage device controller 52, e.g., a hard disk drive controller, a floppy disk drive controller or an optical disk drive controller, may be utilized for controlling the hard disk/floppy disk drive 32, the optical disk drive 28, and the like.

The motherboard of the general-purpose computer can include one or more central processing units 52 and one or more memory devices 54 for storing the instructions of software programs to be executed by the central processing unit 52 for carrying out a particular algorithm or function.

The one or more central processing units 52 may be custom manufactured for a specific application at hand, or may be selected from a wide variety of processors and controllers that are generally available on the market and well known to those skilled in the art. For example, single chip or multi-chip processors manufactured by the INTEL CORPORATION including the 8051, 80386, 80486, PENTIUM and PENTIUM PRO family of processors can be used. In addition, single chip or multi-chip processors manufactured by the MOTOROLA CORPORATION including the MC68000 and MC68040 can be utilized. Further, various clones of the above listed processors that are readily available on the market can be used. For example, processors manufactured by ADVANCED MICRO DEVICES (AMD), CIRYX, C&T and IBM can be readily adapted and utilized as the central processing unit 52 for the general-purpose computer 18.

The general-purpose computer 18 can also act as a workstation 26 whether it be in a standalone configuration or interconnected in the network 24. In addition, workstations 26 requiring additional performance may utilize reduced instruction set computing (RISC) architecture processors and one or more SPARC central processing units 52 such as those manufactured by SPARC INTERNATIONAL, INC., SUN MICROSYSTEMS, INC., the POWER PCT™ by MOTOROLA, the AMD 29000, and the like. Memory devices 54 such as random access memories (RAM), read only memories (ROM) and erasable programmable read only memories (EPROM) are generally used for storing the instructions of the software programs 20 to be executed by the central processing unit 52 of the general-purpose computer 18 for carrying out specific algorithms or functions. These memory devices 54 are well known to those skilled in the art and are available in a wide range of configurations and from a wide variety of manufacturers. Those skilled in the art will appreciate and recognize that the above recitation of central processing units 52 and memory devices 54 is not exhaustive and that others may be substituted without departing from the scope of the invention.

Network Organized Repository of Data System (NORDIS)

Figure 3:
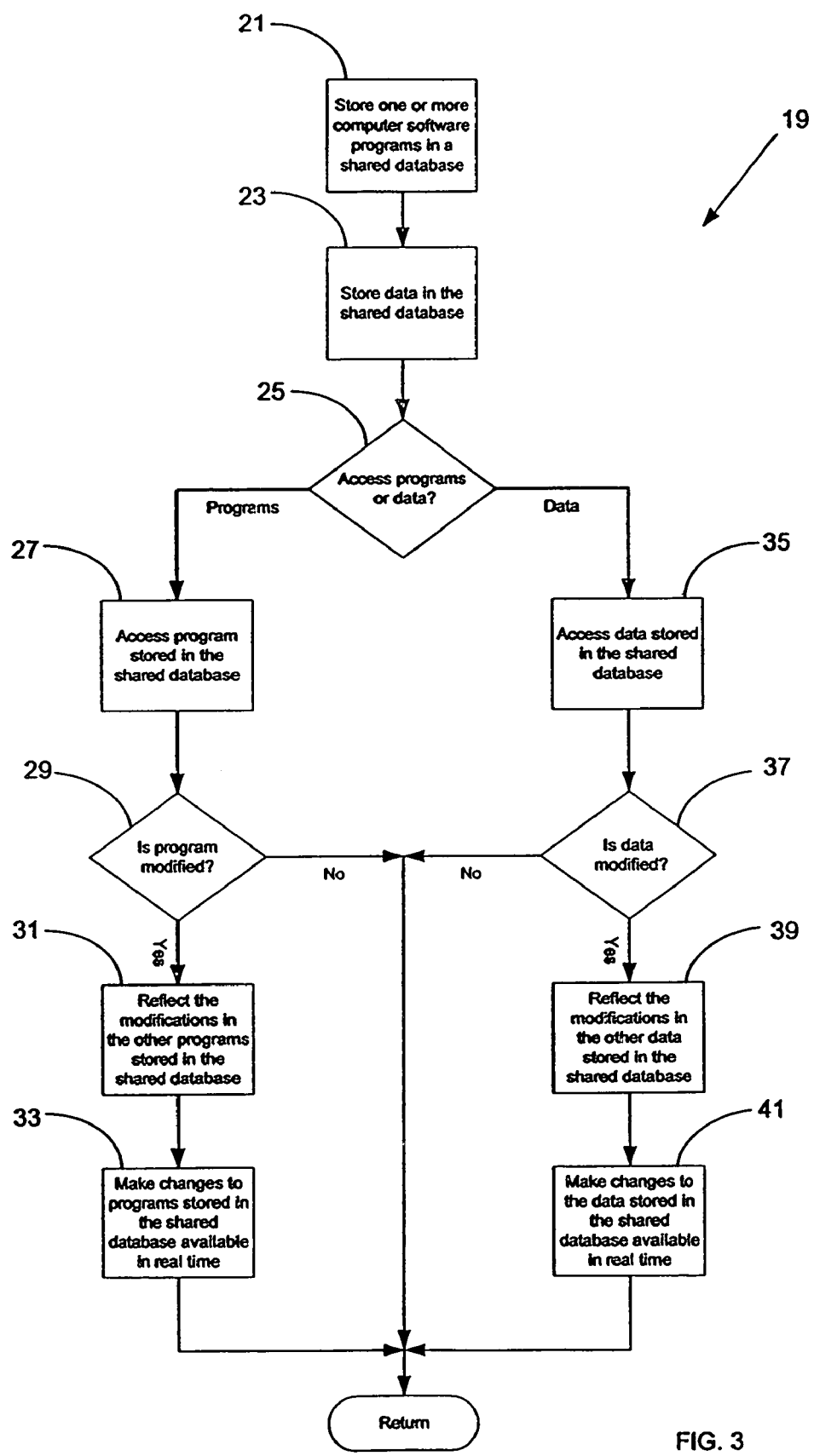
FIG. 3 illustrates an embodiment of a logical flow diagram illustrating storage, access, and modification of data stored in a shared database of a distributed information system.

Referring now to FIG. 3, where one embodiment of a logic flow diagram 19 of a network organized repository of data is shown in logic diagram form. At logic block 21, one or more computer software programs 20 are stored in a shared database 22. At logic block 23, data are also stored in the shared database 22. At decision block 25, it is determined whether a user, a process or a computer has requested access to the programs 20 or data that are stored in the shared database 22. If access to the programs 20 is requested, at logic block 27 the user is permitted access to a selected program 20 stored in the shared database 22. At decision block 29, it is determined whether the user has modified the program 20. If the program has not been modified, the logic flow returns to the previous process. However, if the selected program 20 is modified in any way, at logic block 31, any changes or modifications that are made to the program 20 are reflected in the other programs 20 that are stored in the database 22. Furthermore, at logic block 33, the changes made to the programs 20 stored in the database 22 are made available to every other program on the distributed information system 10 on a real-time basis.

If, at logic block 25, access to data is requested, at block 35 the user is provided with access to the data stored in the database 22. If the data are modified, as determined at block 37, at block 39 the modifications made to the requested data are reflected in all other data stored in the database 22. At block 41, the changes made to the data stored in the database are made available on the distributed information system 10 on a real-time basis.

Telecommunication Distributed Database Management System

Figure 4:
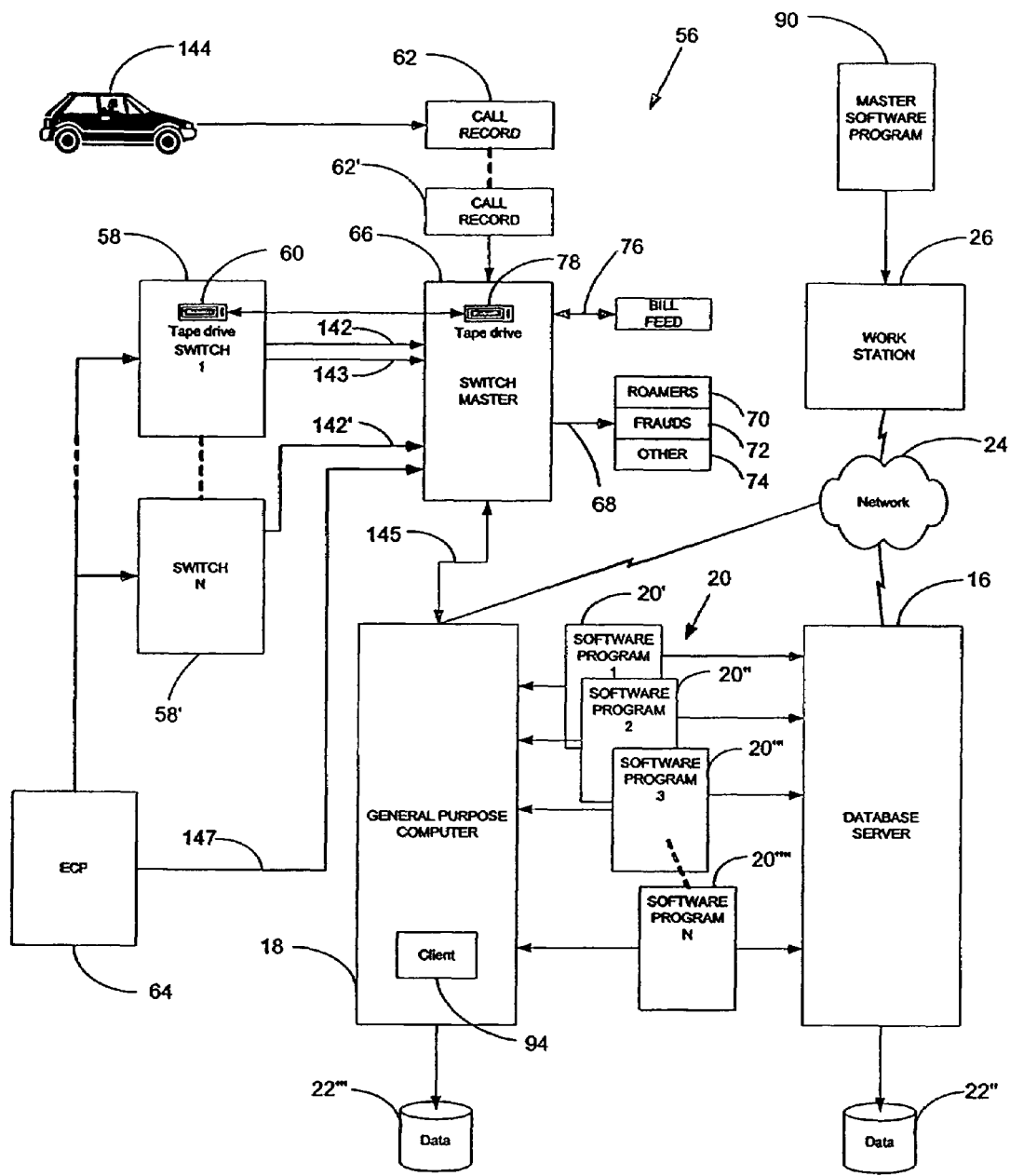
FIG. 4 illustrates an embodiment of a distributed information management system.

Referring now to FIG. 4, where one embodiment of the distributed information system 10 is illustrated which can be utilized as part of a telecommunication distributed database management system 56. In one embodiment, the general-purpose computer 18 can be in communication with one or more other general-purpose computers configured and adapted as the database server 16 component of the telecommunication distributed database management system 56. The database server 16 can be configured as a distributed database management server for creating, maintaining and viewing database data. Those skilled in the art will appreciate that, in addition to the data, the database 22" can also include one or more computer software programs 20 therein.

In one embodiment, the database server 16 of the telecommunication distributed database management system 56 can utilize a structured query language (SQL) database for creating, viewing and maintaining database data. MICROSOFT, ORACLE, GUPTA, INFORMIX, POWERSOFT, ORACLE and SYBASE can all supply SQL databases, for example. Accordingly, the database server 16 can implement an SQL database server such that one or more general-purpose computers 18, workstations 26 or other servers can access and manipulate the data stored in the database 22" that is accessible by the database server 16. In addition, the database server 16 can manage and coordinate the data stored in the database 22 while also performing calculations locally. For example, as discussed above, the database server 16 can be comprised of a general-purpose computer 18 or workstation 26 that includes one or more central processing units 52 for executing instructions according to one or more software programs 20 and a memory 54 for storing such instructions. The database server 16 also can be configured and adapted to perform additional functions and execute additional algorithms in addition to manipulating data within the database 22".

For example, in one embodiment, the database server 16 can execute instructions of a software program 20 for carrying out tasks such as managing the storage and retrieval of database 22" data, generating reports, displaying data, transmitting data to one or more peripheral devices such as printers 38, plotters, facsimiles, modems 36 and other similar devices. In addition, in one embodiment, the database server 16 can execute instructions of one or more software programs 20 for carrying out tasks such as transmitting database data or specific reports to one or more other general-purpose computers 18 or workstations 26 that are in communication therewith.

Further, in one embodiment, the database server 16 can execute instructions of one or more software programs 20 for carrying out tasks such as communicating database 22" data or reports to one or more other computer software programs 20 whose instructions are executed on other general-purpose computers across the telecommunication distributed database management system 56. In addition, the database server 16 can execute instructions of one or more software programs 20 for carrying out tasks such as sending database data or reports to a network address or electronic mail (e-mail) address in response to a query or in response to a predetermined set of conditions. Still further in one embodiment, the database server 16, or for example any one of the one or more general-purpose computers 18 in communication with the network 24, can execute instructions of a software program 20 for carrying out the function of broadcasting a wireless signal to be received by one or more users carrying a wireless device or to be received by other devices having incorporated therein a device in response to a predetermined set of conditions. Those skilled in the art will appreciate that the wireless device can be, for example, a pager receiving a paging signal. Those skilled in the art will recognize that the above-enumerated tasks to be performed by the database server 16 can be performed by other components within the telecommunication distributed database management system 56. Also, such tasks are illustrative in nature are not intended to limit the scope of the invention.

Facilities Information Management System

Figure 5:
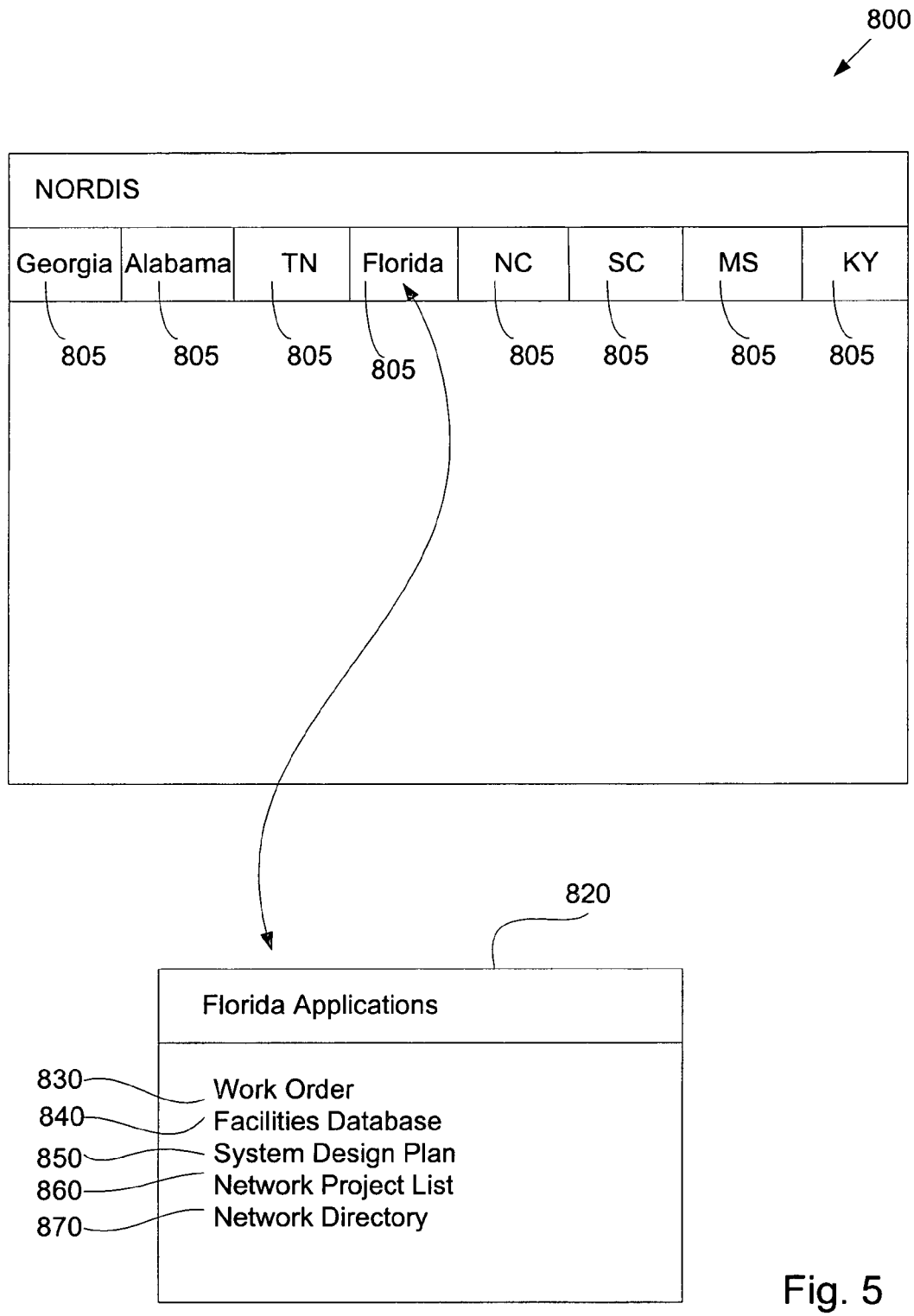
FIG. 5 is a block diagram depicting a graphical user interface for entry into a network organized repository of data and entry into computer software applications illustrative of an exemplary embodiment of the present invention.

FIG. 5 is a block diagram depicting a graphical user interface for entry into a network organized repository of data and computer software applications within a distributed information system, described above. According to an exemplary embodiment of the present invention, a user of a facilities tracking application of the present invention may access the application through the network organized repository of data system (hereinafter "Nordis"). Entry into the Nordis system allows the user access to computer programs 20 and the ability to store, access and update data maintained in the distributed information system described herein. As illustrated in FIG. 5, a graphical user interface 800 is provided for entry into the Nordis system. The graphical user interface 800 comprises a number of location buttons including the location buttons 805. According to the exemplary graphical user interface, illustrated in FIG. 5, the location buttons include buttons for the states of Georgia, Alabama, Tennessee, etc.

When a user of the Nordis system desires entry into the Nordis system, the user selects on the location button applicable to the user's location. For example, if the user clicks on the Florida location button 805, a second graphical user interface 820 is presented to the user, which allows the user access to software applications available for that location. For example, the Florida applications, accessed through the graphical user interface 820, include a work order application 830, a facilities tracking application 840, a system design plan application 850, a network project list application 860, and a network directory application 870. The applications 830, 840, 850, 860, 870 are all embodiments of software programs 20 described above. It should be understood to those skilled in the art, that different applications may be available for different locations. That is, a given location may require more or less computer software applications than another location.

According to an exemplary embodiment of the present invention, a user desiring access to the facilities database application 840, for example, under the Florida applications graphical user interface 820 selects the Florida location button 805 and then the facilities database application 840. The facilities database application 840 provides a mechanism for tracking facilities related information from both an operational and an engineering standpoint. The system and method of the present invention allows a user to enter new facilities, as well as, to maintain, update and track information related to new facilities, existing facilities, and relationships between facilities. An exemplary embodiment of the present invention is described below with reference to facilities used in the implementation of telecommunications systems.

Typical utilization of the facilities database application 840 with reference to telecommunications systems includes a number of categories. For example, data on nodes which include cellular telecommunications sites, digital cellular switches, and a variety of wire lines switching centers may be entered and maintained using the application 840. The facilities database 840 of the present invention provides for entry of a node name, node location, including latitude/longitude data, and node type for data storage and maintenance, as well as, for graphical presentation to a user. A second category of utilization for the facilities database application 840 is the circuits category. Circuits including land line and wireless implementation as well as multiple variations of each type of land line, wireless, and microwave circuit implementations are included in the types of circuits for which data is maintained and presented using the facilities database application 840. Circuits may be created and graphically displayed to users by providing end points for the circuits and circuit capacity. A third category of the type of data for which the facilities database application 840 may be utilized includes terminations-assignments for facilities. A user may provide the application with details on the information being transported by new circuits. The facilities database application 840 provides a mechanism for tracking usage details on the circuit from end point to end point. Usages include for example, radio assignments, data links, and radio frequency data and analysis.

Figure 6:
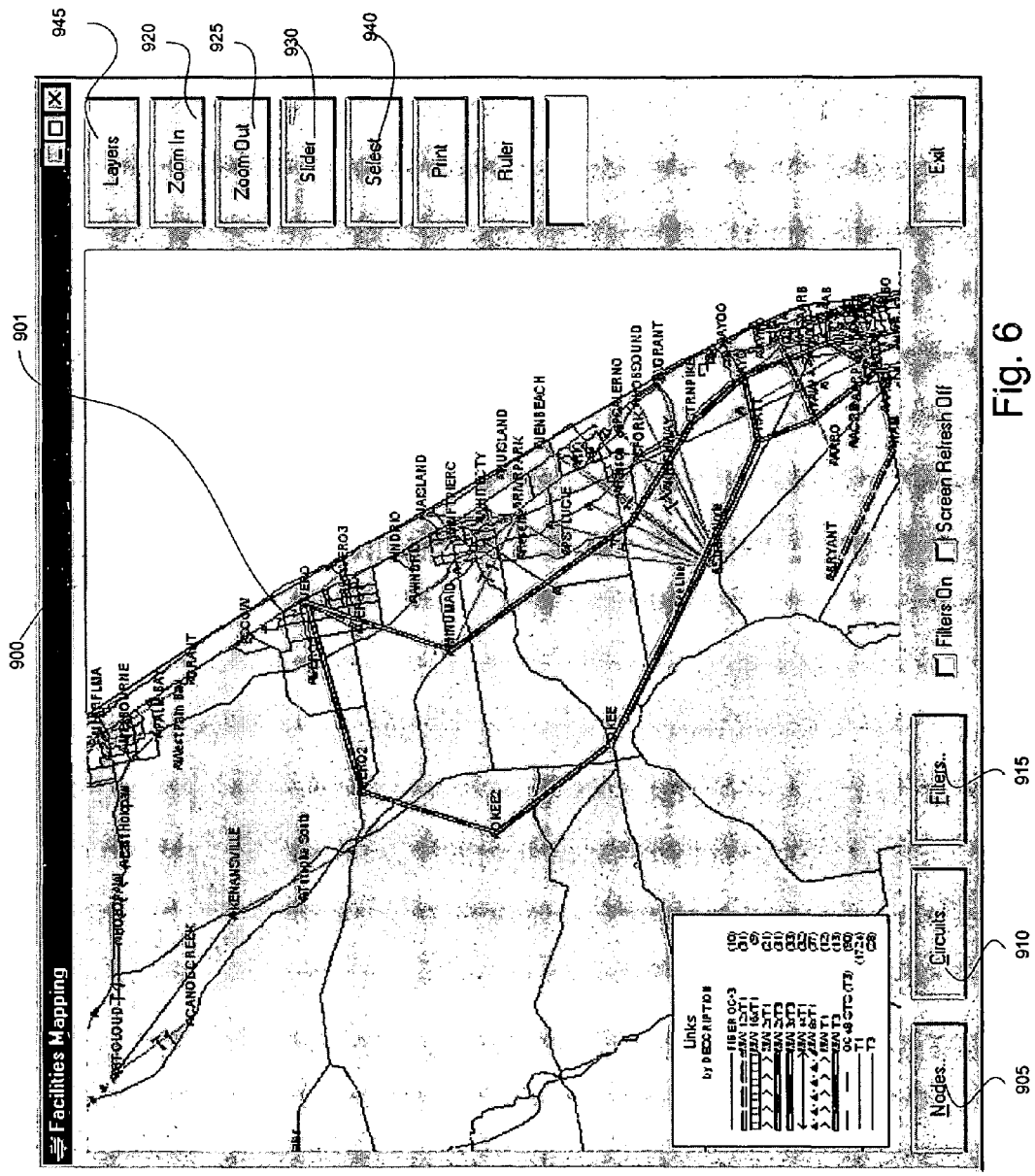
FIG. 6 illustrates a facilities engineering entry interface according to an exemplary embodiment of the present invention.

Referring to FIG. 6, a facilities engineering entry interface 900 is illustrated and provides an entry point to the various components of the facilities database application 840. As shown in FIG. 6, a map 901 is illustrated showing a variety of telecommunications facilities and circuits and transmission lines connected therebetween.

The facilities engineering entry page 900 is primarily utilized for node selection, circuit selection, filter selection, and map navigation. Selection of a specific node represented on the map 901 may be accomplished by selecting the graphical representation of the node to obtain detailed information on the node. Alternatively, the nodes button 905 may be utilized to select a given node to obtain information thereon. Similarly, a specific circuit may be selected by selecting anywhere on the graphical representation of the circuit to bring up details for the circuit. Alternatively, information on a given circuit may be provided by selecting the circuits button 910.

Due to the extensive amount of data provided by the facilities database application 840 via the distributed information system, a means for selecting specific network components is provided by selecting the filters button 915. For map navigation, zoom-in and zoom-out features allow the user to obtain high level map images or magnified images of smaller more detailed locations represented by the map. The slider function allows the user to slide the map in different directions according to the users desired view.

Figure 7:
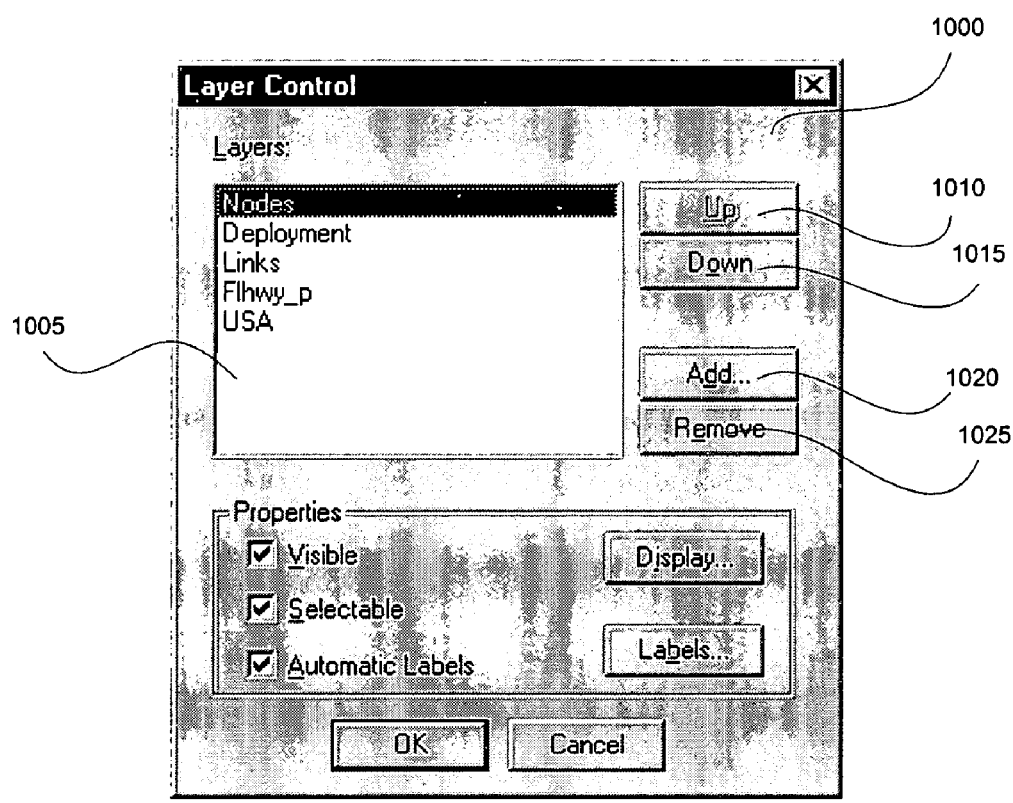
FIG. 7 illustrates a layer control interface according to an exemplary embodiment of the present invention.

The layers button 945 provides the ability to add, remove, or edit layers presented by the mapping application. After selecting the layer button, a layer control dialog 1000, illustrated in FIG. 7, is presented to the user. As shown in FIG. 7, the user may then select various layers of the map to "drill-down" into the map. That is, the user may modify the presentation of the map to show in addition to facilities, various other map properties, such as local highways, terrain, cities and the like. On the other hand, the user may take away layers of undesired information leaving only information in which the user is presently interested.

If new facilities are added, the user may refresh the graphical display 901 of the facilities engineering entry interface 900 to see the newly added facility. Likewise, the mapping features are advantageous in catching and highlighting erroneous information input by the user. For example, if the user enters an incorrect latitude and longitude location for a newly entered facility, upon refreshing the map 901, the user will immediately notice that the newly entered facility is in the wrong location.

Figure 8:
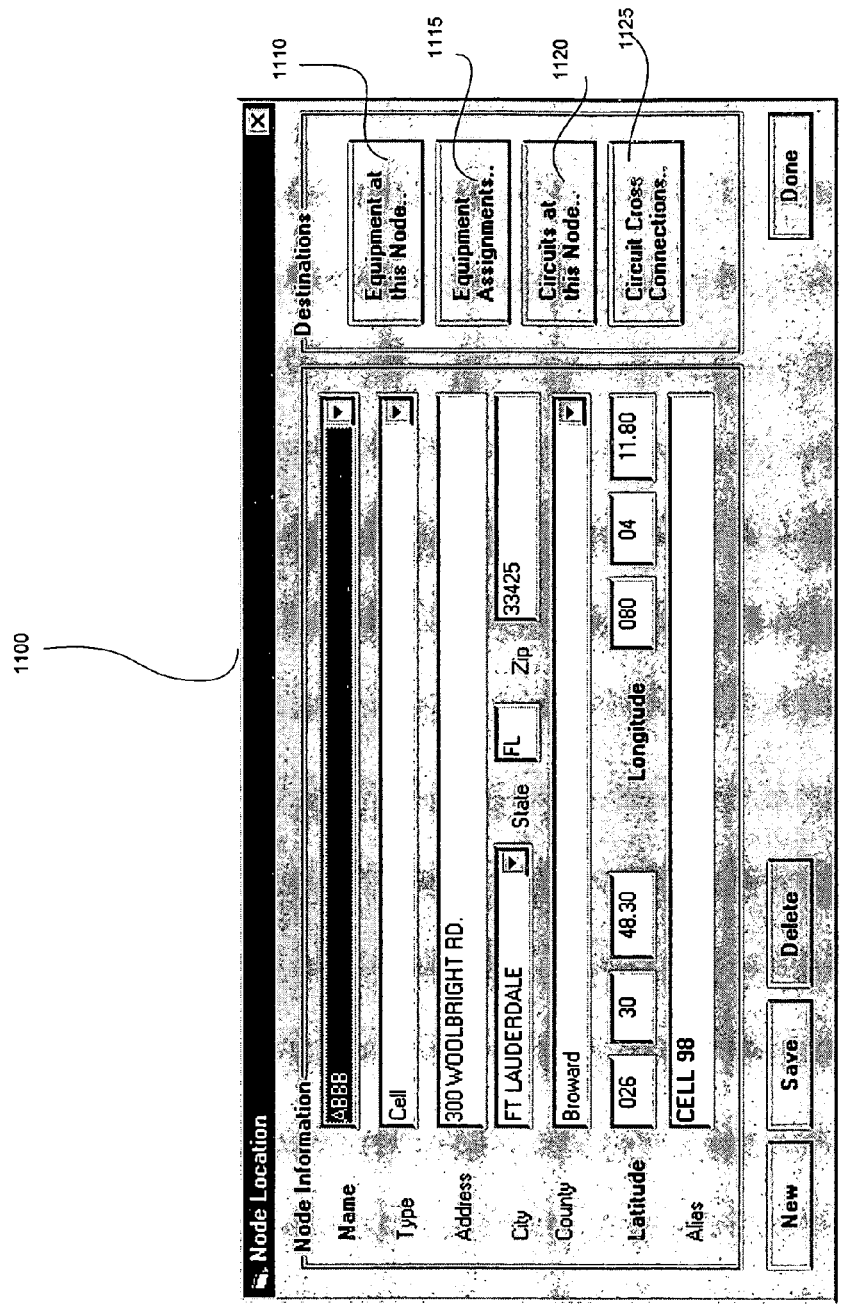
FIG. 8 illustrates a node location interface according to an exemplary embodiment of the present invention.

Referring to FIG. 8, a node location interface 1100 is illustrated. The node location interface is used for entry of new network nodes into the system. Upon providing a location for the new node, a geographic representation of the new node will be provided by the facilities database application 840 and presented graphically on the map 901. In order to add a node to the system, the user first enters the facility engineering entry page 900 and selects the nodes button 905. Selection of the nodes button 905 launches the nodes page 1100. Using the nodes page 1100, the user enters a node name, selects a node type, enters any and all data relating to the nodes address, and enters the latitude and longitude of the node. After the foregoing information is entered, the user selects the save button to add the node to the data maintained by the facilities database application 840 in the distributed information system and for presentation of the node on the map 901. After a new node is entered into the system, it may be used as an end point for circuits. Existing node information can be retrieved by selecting the node's name.

Figure 9:
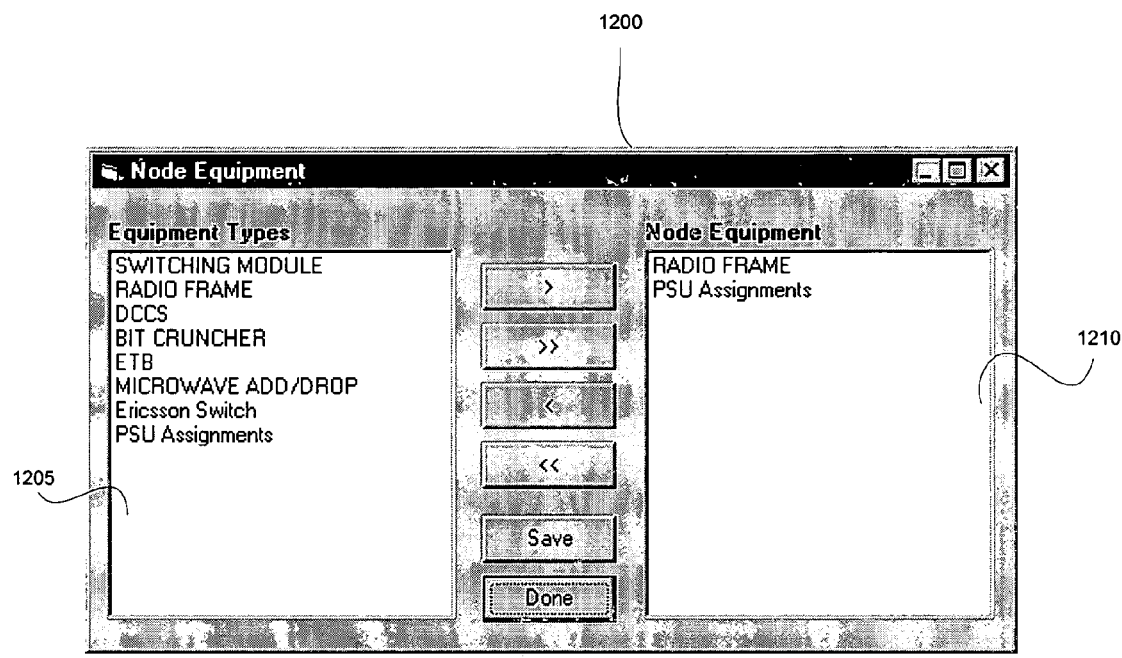
FIG. 9 illustrates a node equipment interface according to an exemplary embodiment of the present invention.

In order to enter information on equipment located at a new node where circuits will terminate and/or originate, the "equipment at this node" button 1110 launches the node equipment interface 1200, illustrated in FIG. 9. Once equipment has been added to a node, it may be necessary to connect the equipment to other facilities in a network of facilities. Connection of the equipment within a new node to other nodes facilities is accomplished through the node terminations interface 1300, illustrated in FIG. 10. Any circuit passing through the new node may be connected using the connections interface 1400, illustrated in FIG. 11.

Referring to FIG. 9, the node equipment page 1200 is illustrated. The node equipment page provides the user the ability to include an equipment list for a new node, or to update an equipment list for an existing node. The equipment list is also utilized for detailing any cross-connect or circuit-to-equipment interfacing. Adding new equipment to a node requires moving the equipment description from the list of known equipment types 1205 to the node equipment list 1210.

Figure 10:
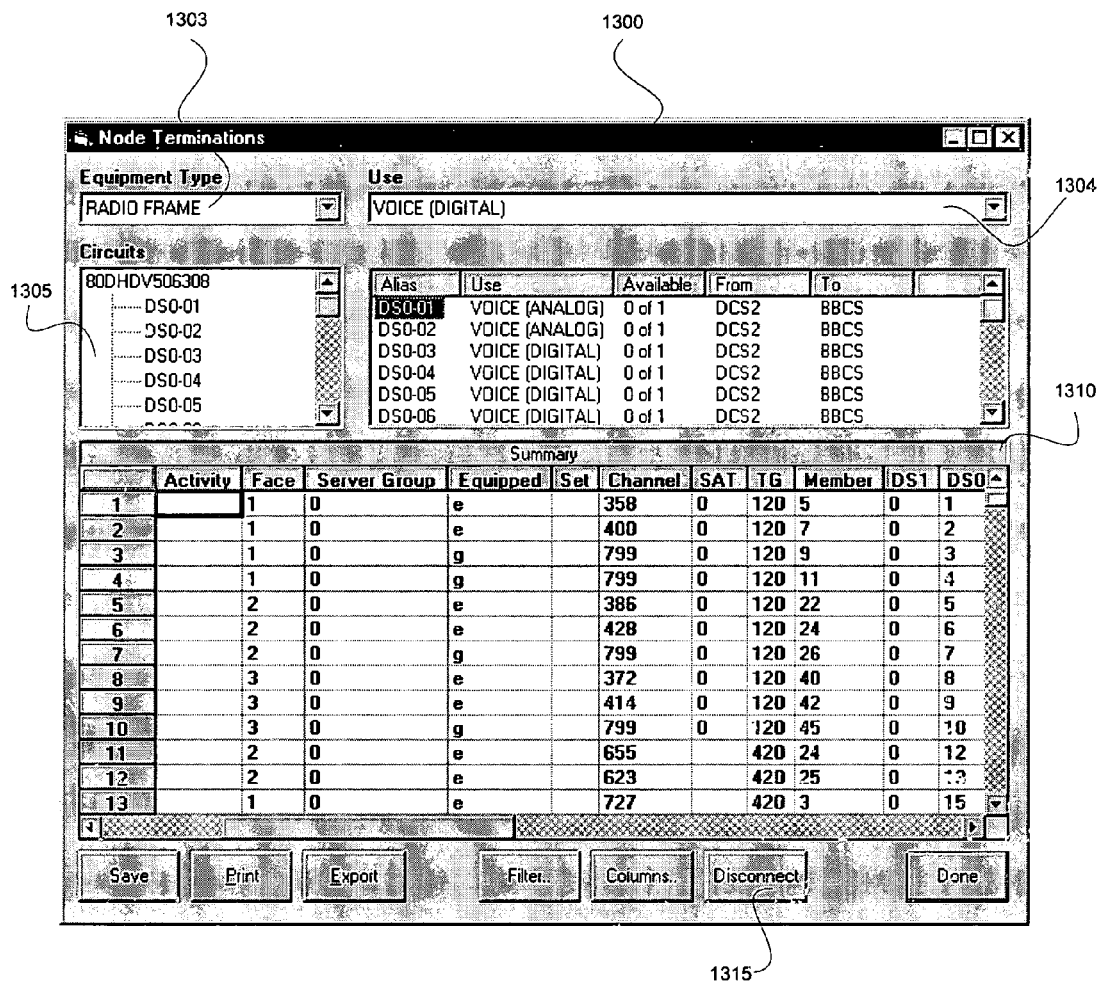
FIG. 10 illustrates a node terminations interface according to an exemplary embodiment of the present invention.

FIG. 10 illustrates a node terminations interface 1300, mentioned above. This interface is used to enter and edit usage details of a given circuit. Having selected the desired piece of equipment, connections between the equipment and other equipment or other facilities may be entered or edited in a three-step process. First, all fields are completed except for the use field and the circuit field. Second, the use for the circuit is selected, and third, the circuit is selected for connection which highlights the desired circuit. Once highlighted, the selected circuit is dragged to the desired line of the grid 1310. Disconnecting a circuit requires highlighting a grid line and selecting the disconnect button 1315. As should be understood by those skilled in the art, a "drill-down" feature may be provided allowing the user to obtain more information on given circuits displayed in the node terminations page 1300.

Figure 11:
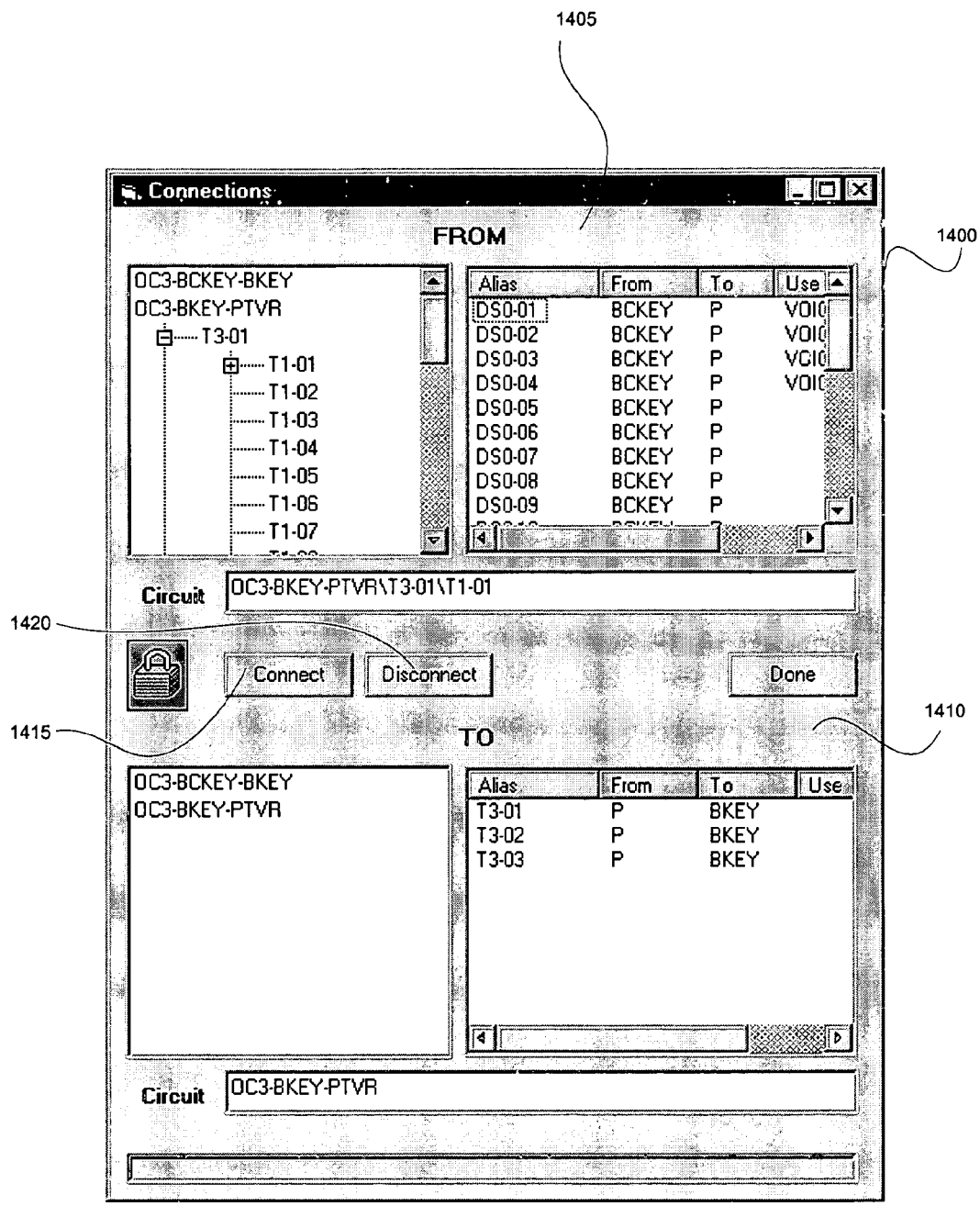
FIG. 11 illustrates a node connections interface according to an exemplary embodiment of the present invention.

Within a node, it is often necessary to track the specific information on how telecommunication traffic enters and exists the node. The connections interface 1400, illustrated in FIG. 11, provides a method for storing information of this type. Using the connections interface 1400, a user may track circuit-to-circuit details on how one node or facility connects to a second node or facility. In some instances where adequate information is known about the connection, mappings may be implemented by the facilities database application 840. For example, a DS1-to-DS1 connection may build out a DS0 level connection. A connection is accomplished by selecting a firm circuit from the "from" section 1405 and a "to" circuit from the "to" section 1410 followed by a selection of the connect button 1415. According to a preferred embodiment, the connection icon will turn green and change to a locked position, while unconnected circuits are displayed with a red and unlocked image. To view a previously existing connection, a desired circuit is highlighted on the left side of the "from" section 1405. If the user desires to disconnect the circuit, the circuit may be disconnected by selecting the disconnect button after the desired circuit is highlighted.

Figure 12:
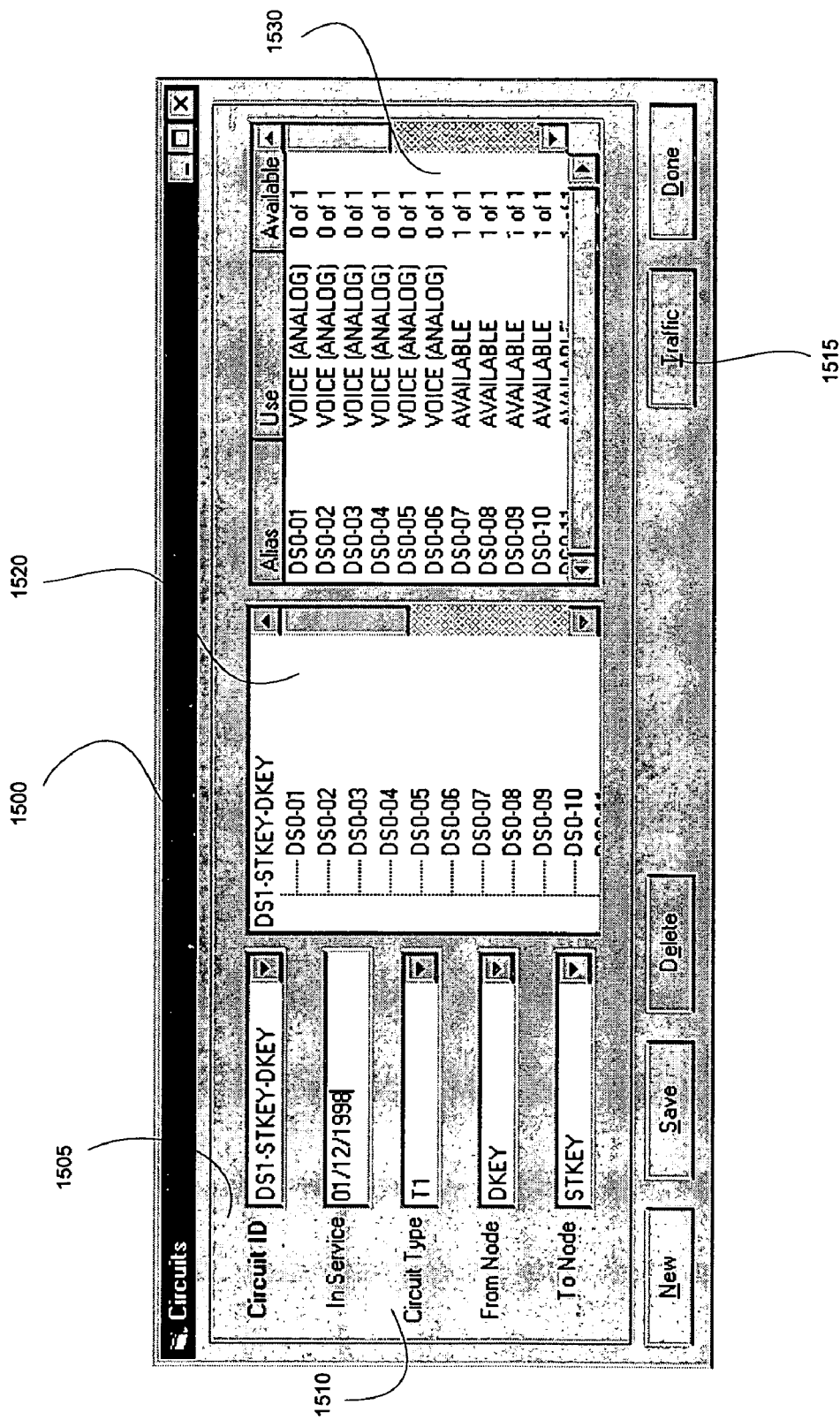
FIG. 12 illustrates a circuits interface according to an exemplary embodiment of the present invention.

Referring to FIG. 12, a circuit interface 1500 is illustrated. Using the circuit interface 1500, new circuits may be entered by providing a circuit I.D., circuit type, and end points for the circuit. After a circuit has been entered into the facilities database application 840, the circuit may be used as a pathway for network traffic. For circuits with a capacity greater than DS0, a "drill-down" feature may be provided. By selecting on a circuit's heading, as shown in the list box 1520, details for the subcomponents of the circuit are displayed in the list box 1530. Details include an alias, circuit use, and availability. An alias can be modified by selecting the alias and changing the value.

Figure 13:
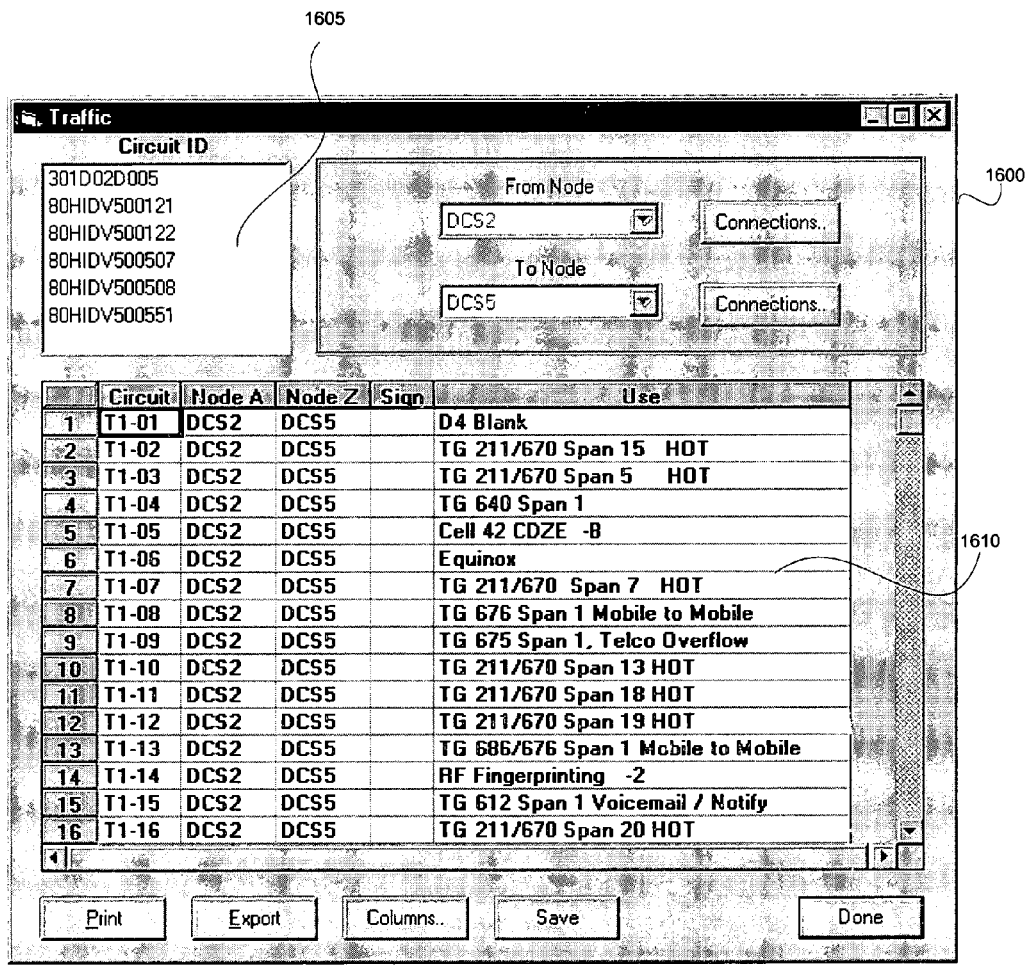
FIG. 13 illustrates a traffic interface according to an exemplary embodiment of the present invention.

In order to view more specific information on a given circuit, the traffic button 1515 may be selected to open the traffic interface 1600 illustrated in FIG. 13. The traffic interface 1600 provides a means for investigating usage of a selected circuit. By selecting the desired circuit in the circuit I.D. box 1605, details of the subcomponents of the circuit are displayed in the display grid 1610. A breakout of the circuit's path may be viewed by selecting on the specific circuit within the display grid 1610.

Figure 14:
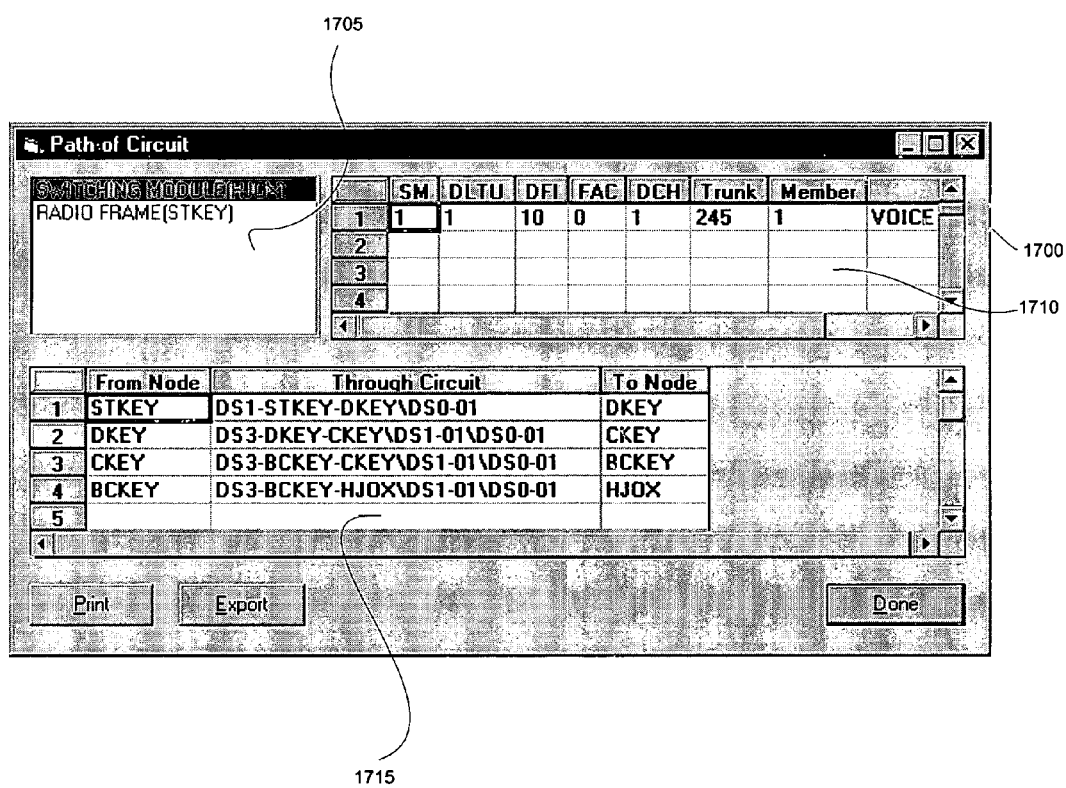
FIG. 14 illustrates a circuit path interface according to an exemplary embodiment of the present invention.

Selecting a specific circuit for breakout information on the circuit's path, as described, opens a circuit path interface 1700, illustrated in FIG. 14. Utilizing the circuit path interface 1700, the user may view the individual paths required to carry a circuit from an origination point to a termination point. Additionally, the user is provided with data relating to any terminations the circuit takes. Specific information of the terminations for a specific circuit are displayed by selecting the desired piece of the equipment in the list box 1705 in the upper left-hand corner of the circuit path interface 1700.

Figure 15:
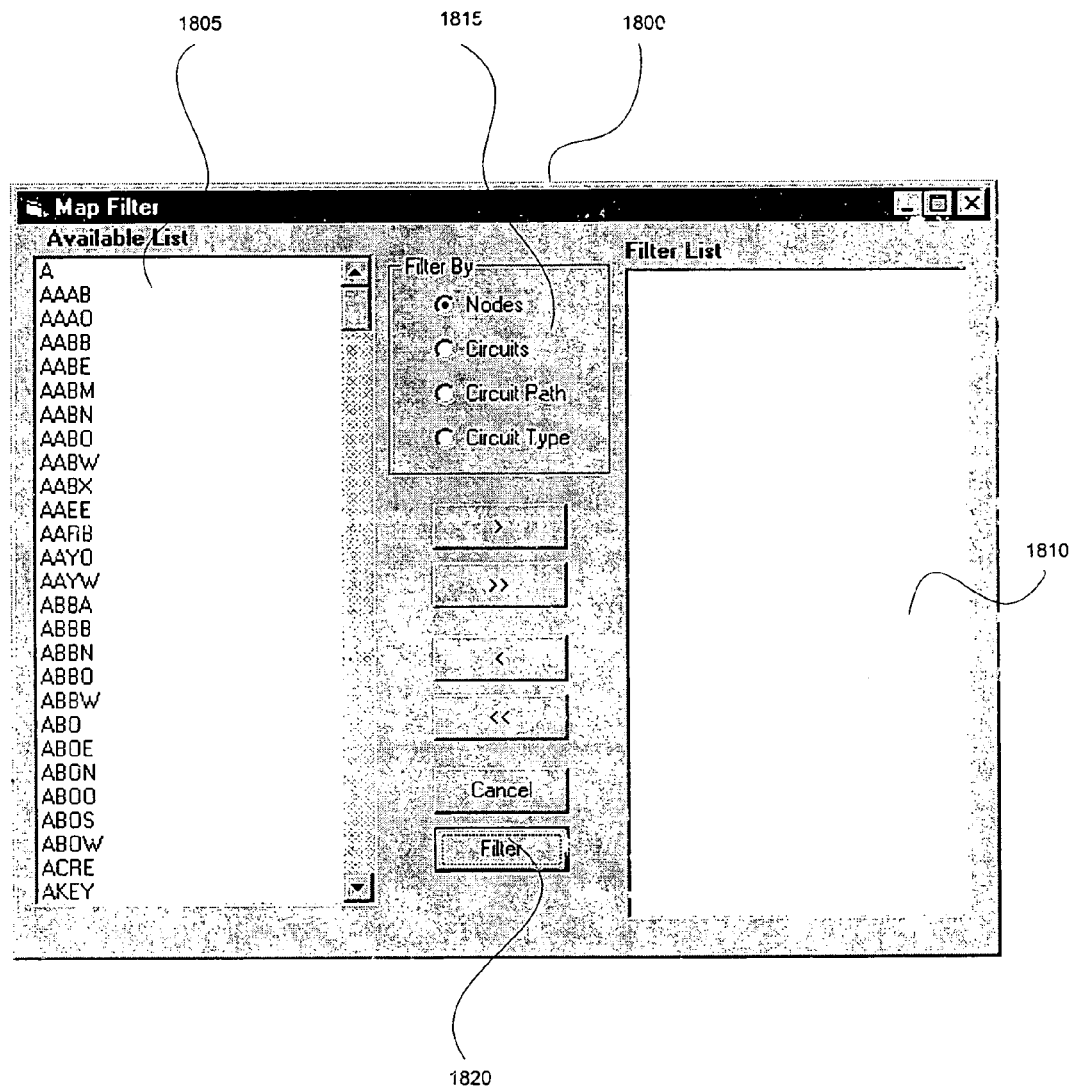
FIG. 15 illustrates a map filter interface according to an exemplary embodiment of the present invention.

As a system grows in complexity, it becomes necessary to provide a means for finding specific data in a timely manner. To meet this requirement, a map filter interface 1800, illustrated in FIG. 15, is provided. Referring the FIG. 15, the user first selects the type of component used to filter the data found in the "filter by" box 1815. Once selected, a list of existing facilities is displayed in the available list 1805. From this list, the user chooses which of the facilities to include in the filtering process. After the user selects a particular facility, the filter button 1820 is selected. Upon selection of the filter button 1820, the user is returned to the facilities engineering entry interface 900 where the system components meeting the filtered criteria are displayed on the map.

As described, the method and system of the present invention provides for entering, storing, maintaining, and graphically representing facilities-related information. Using existing mapping technology, newly entered facilities, existing facilities, and interrelationships between facilities are graphically represented to provide the user an efficient and helpful way of locating facilities and facility information. By selecting on facilities and relationships between facilities, such as data lines, the user may obtain specific information about facilities and connections therebetween. For example, the user may select on a DS3 line to drill down to see a presentation and listing of the T1 lines comprising the DS3 line. Using the zoom in/zoom out functionality, the user may obtain a number of different views and the user may add layers of information onto the mapping presentation or strip away layers of information from the mapping presentation as desired.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A computer-assisted method for tracking deployment of telecommunications facilities and providing real-time mapping information about the deployment of the facilities, comprising:
   providing a user interface for accepting a new facility;
   receiving a type and a location of the new facility via the user interface into a distributed information system;
   receiving a connection between the new facility and an existing facility;
   displaying the new facility, the existing facility, and the connection between the new facility and the existing facility on a computer-generated map, wherein the computer-generated map includes a geographical area in which the new facility, the existing facility, and the connection between the new facility and the existing facility are located;
   receiving a filtering command;
   if the filtering command comprises displaying facilities, then altering the computer-generated map to display the new facility and the existing facility; and
   if the filtering command comprises displaying connections, then altering the computer-generated map to display the connection between the new facility and the existing facility.

2. The method of claim 1, wherein the distributed information system includes an automated facilities tracking system.

3. The method of claim 1, wherein entering the location of the facility includes entering a latitude and longitude for the new facility.

4. The method of claim 1, further comprising providing an equipment entry interface for adding equipment to the new facility.

5. The method of claim 1, further comprising providing an equipment entry interface for modifying equipment associated with the new facility.

6. The method of claim 1, further comprising providing a facility terminations interface for entering operational information for a circuit.

7. The method of claim 6, further comprising
   entering a circuit type;
   entering a circuit use; and
   connecting the circuit.

8. The method of claim 6 further comprising editing operational information for the circuit via the facility terminations interface.

9. The method of claim 8 wherein editing operational information for the circuit includes disconnecting the circuit.

10. The method of claim 1, further comprising providing a connections interface for tracking telecommunications traffic through the new facility.

11. The method of claim 10, further comprising tracking connectivity between the new facility and other facilities.

12. The method of claim 1, further comprising providing a circuits interface for entering a new circuit.

13. The method of claim 12 further comprising:
    entering a circuit identification;
    entering a circuit type; and
    entering end points of the circuit.

14. The method of claim 1, further comprising providing a circuit traffic interface for tracking the use of the circuit.

15. The method of claim 14, further comprising displaying operational information regarding the use of the circuit.

16. The method of claim 1, further comprising providing a circuit path interface for tracking individual paths required for carrying a circuit from an origination point to a termination point.

17. The method of claim 16, further comprising displaying circuit path information.

18. The method of claim 1, further comprising providing a mapping user interface for displaying the map of the geographical area in which the new facility, the existing facility, and the connection between the new facility and the existing facility are located.

19. The method of claim 1, further comprising providing a map filtering interface for receiving the filtering command.

20. The method of claim 5, further comprising updating the displayed map in response to equipment changes.

21. The method of claim 18, further comprising providing a layer control interface for displaying different layers of the map displayed by the mapping user interface.

22. The method of claim 1, further comprising displaying information regarding the new facility by selecting the new facility displayed on the computer-generated map.

23. The method of claim 1, wherein the new facility includes one or more telecommunications sites.

24. The method of claim 23, wherein the telecommunications sites include cellular telecommunications sites, digital cellular switches, wireline switching centers, wireless switching centers, cables, and transmission lines.

25. The method of claim 1, wherein providing a user interface for accepting a new facility includes providing a user interface for accepting edits to existing facilities.

26. The method of claim 25, further comprising editing existing facilities information.

* * * * *